Nov. 6, 1956  R. J. AKERS  2,769,470
HAND SAW DEPTH GAUGE
Filed March 8, 1955
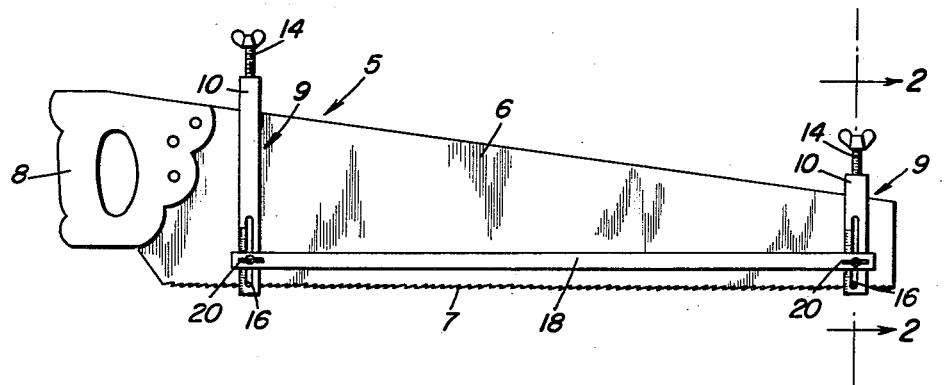
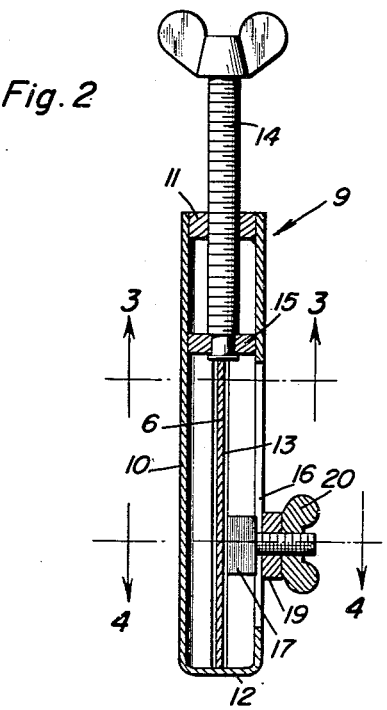
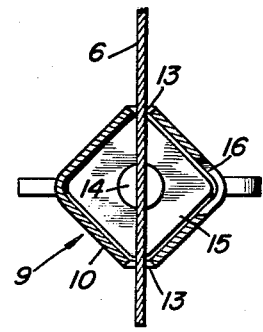
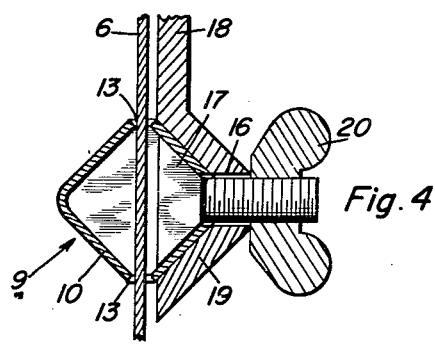
Roy J. Akers
INVENTOR.

though engageable with the saw blade, said tubes having slots therein for the passage of the blade, said bars for engagement with the blade.

United States Patent Office 2,769,470
Patented Nov. 6, 1956

2,769,470

HAND SAW DEPTH GAUGE

Roy J. Akers, Portsmouth, Ohio

Application March 8, 1955, Serial No. 492,865

4 Claims. (Cl. 145—35)

The present invention relates to new and useful improvements in hand saw gauges, and has for its primary object to provide, in a manner as hereinafter set forth, a device of this character which may be expeditiously and accurately adjusted for permitting the saw to cut to any desired depth.

Another very important object of the invention is to provide an adjustable depth gauge of the aforementioned character comprising novel means for removably mounting the device for use on the usual blade of a conventional hand saw without the necessity of structurally altering said blade.

Other objects of the invention are to provide a hand saw depth gauge of the character set forth which will be comparatively simple in construction, strong, durable, compact, light in weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, showing a depth gauge constructed in accordance with the present invention mounted on a hand saw;

Figure 2 is a cross-sectional view, taken substantially on the line 2—2 of Figure 1;

Figure 3 is a fragmentary view in horizontal section, taken substantially on the line 3—3 of Figure 2;

Figure 4 is a horizontal sectional view, taken substantially on the line 4—4 of Figure 2.

Referring now to the drawing in detail, it will be seen that reference character 5 designates generally a conventional hand saw. The hand saw 5 includes the usual blade 6 having a toothed cutting edge 7, together with a suitable handle 8 on one end of said blade.

The embodiment of the present invention which has been illustrated comprises a pair of elongated clamps of suitable metal which are designated generally by reference character 9. The clamps 9 are adapted to be removably mounted on the end portions of the saw blade 6 and toward this end, one of said clamps is considerably longer than the other.

The clamps 9 include substantially square tubes 10 comprising closed upper and lower ends 11 and 12, respectively. The substantially square tubes 10 are adapted to be slipped longitudinally onto the saw blade 6 from the forward end thereof. Toward this end, the diagonally opposite corner or side portions of the tubes 10 have formed therein vertical slots 13 for the reception of the saw blade. Thumb screws 14 are threadedly mounted in the upper ends 11 of the tubes 10. Plates 15 are swivelly mounted on the lower end portions of the thumb screws 14 for sliding movement in the tubes 10. The thumb screws 14 are engageable with the back edge of the saw blade 6 for firmly securing the clamps 9 in position thereon in an obvious manner.

The lower front portions of the tubes 10 have formed vertically therein graduated or scaled slots 16. Bolts 17 are mounted for vertical sliding adjustment in the tubes 10 and project outwardly therefrom through the slots 16. A gauge bar 18 of suitable metal, which parallels the toothed edge 7 of the saw blade 6, is mounted on the bolts 17. The bar 18 includes substantially V-shaped, apertured end portions 19 which are slidably engaged with the lower portions of the tubes 10 and through which the bolts 17 pass. Wing nuts 20 are threaded on the bolts 17 for securing the bar 18 in adjusted position.

It is thought that the operation of the device will be readily apparent from a consideration of the foregoing. Briefly, the clamps 9 are slipped longitudinally on the blade 6 from the forward end thereof and secured by tightening the hand screws 14. When the clamps 9 are thus mounted, the blade 6 of the saw retains the bolts 17 in position in the slots 16. This is shown to advantage in Figure 4 of the drawing. The gauge bar 18 is then mounted on the projecting bolts 17 and the wing nuts 20 are applied. The gauge bar 18 is then adjusted to the desired position parallel with the toothed edge 7 of the blade 6, and the wing nuts 20 are tightened for firmly securing the adjustment. The sawing operation then proceeds and when the desired depth is reached, the bar 18 engages the work for arresting the blade 6.

The foregoing is considered as illustrative only of the principles of the invention. Further, since numerous modifications and equivalents may readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A hand saw depth gauge comprising: a pair of clamps adapted to be mounted on the end portions of a saw blade, said clamps including tubes adapted to be slipped longitudinally on the blade and having slots therein for the passage of said blade, hand screws threadedly mounted on one end of the tubes and engageable with the blade for securing the tubes thereon, a depth bar having its end portions secured to the tubes, said depth bar substantially paralleling the cutting edge of the blade and being engageable with the work, and means for adjusting said depth bar on the tubes.

2. A hand saw depth gauge comprising: a pair of clamps for mounting on a saw blade, said clamps including metallic tubes for transverse mounting on the blade and having slots therein for the passage of said blade, thumb screws threadedly mounted in one end portion of the tubes for engagement with the blade for clamping said tubes thereon, a work engaging depth bar paralleling the cutting edge of the blade, and means for adjustably mounting said bar on the tubes.

3. A hand saw depth gauge comprising: a pair of clamps for mounting on a saw blade, said clamps including metallic tubes for transverse mounting on the blade and having slots therein for the passage of said blade, thumb screws threadedly mounted in one end portion of the tubes for engagement with the blade for clamping said tubes thereon, a work engaging depth bar paralleling the cutting edge of the blade, and means for adjustably mounting said bar on the tubes, said tubes having additional longitudinal slots therein, bolts mounted in the tubes and operable in the slots, said bolts extending through the end portions of the depth bar, and wing nuts threaded on the bolts for securing the bar thereon and for holding said bar in adjusted position on the tubes.

4. A hand saw depth gauge of the character described comprising: a pair of tubes for transverse mounting on the end portions of a saw blade, said tubes having slots for receiving the blade, hand screws threadedly mounted on the tubes for engagement with the blade for securing said tubes in position thereon, said tubes having longitudinal slots therein, a depth bar mounted for adjustment on the tubes, and means comprising bolts operable in the slots for securing the depth bar in adjusted position on the tubes.

References Cited in the file of this patent
UNITED STATES PATENTS

| | | |
|---|---|---|
| 286,018 | Jones | Oct. 2, 1883 |
| 1,057,806 | Curby | Apr. 1, 1913 |
| 1,534,541 | Posey | Apr. 21, 1925 |
| 1,571,231 | Bolli | Feb. 2, 1926 |